(12) United States Patent
Wollny et al.

(10) Patent No.: US 12,715,165 B2
(45) Date of Patent: Aug. 25, 2026

(54) COMPUTER-IMPLEMENTED METHOD FOR CONTROLLING AND/OR MONITORING AT LEAST ONE INJECTION MOLDING PROCESS

(71) Applicant: BASF SE, Ludwigshafen am Rhein (DE)

(72) Inventors: Andreas Wollny, Ludwigshafen am Rhein (DE); Reinhard Jakobi, Ludwigshafen am Rhein (DE); Andreas Wonisch, Ludwigshafen am Rhein (DE); Oliver Geiger, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 502 days.

(21) Appl. No.: 18/041,372

(22) PCT Filed: Aug. 13, 2021

(86) PCT No.: PCT/EP2021/072589
§ 371 (c)(1),
(2) Date: Feb. 10, 2023

(87) PCT Pub. No.: WO2022/034210
PCT Pub. Date: Feb. 17, 2022

(65) Prior Publication Data

US 2023/0347564 A1 Nov. 2, 2023

(30) Foreign Application Priority Data

Aug. 14, 2020 (EP) .................................... 20191130

(51) Int. Cl.
*B29C 45/76* (2006.01)

(52) U.S. Cl.
CPC ........ *B29C 45/766* (2013.01); *B29C 45/7693* (2013.01); *B29C 2945/76006* (2013.01);
(Continued)

(58) Field of Classification Search
CPC ............. B29C 45/766; B29C 45/7693; B29C 2945/76006; B29C 2945/7604;
(Continued)

(56) References Cited

U.S. PATENT DOCUMENTS 5,900,259 A * 5/1999 Miyoshi ............. B29C 33/3835 425/149
11,052,591 B2 7/2021 Schiffers et al.
(Continued)

FOREIGN PATENT DOCUMENTS

CN 110962301 A * 4/2020 ............. B29C 45/26
DE 102013111257 B3 8/2014
(Continued)

OTHER PUBLICATIONS

Wikipedia: "Moldflow," available at <en.wikipedia.org/wiki/Moldflow>.
(Continued)

*Primary Examiner* — Kenneth M Lo
*Assistant Examiner* — Zachary Andrew Cain
(74) *Attorney, Agent, or Firm* — Armstrong Teasdale LLP

(57) ABSTRACT

Disclosed herein is a computer-implemented method for controlling and/or monitoring at least one injection molding process in at least one injection molding machine. The method includes:

Figure 1:
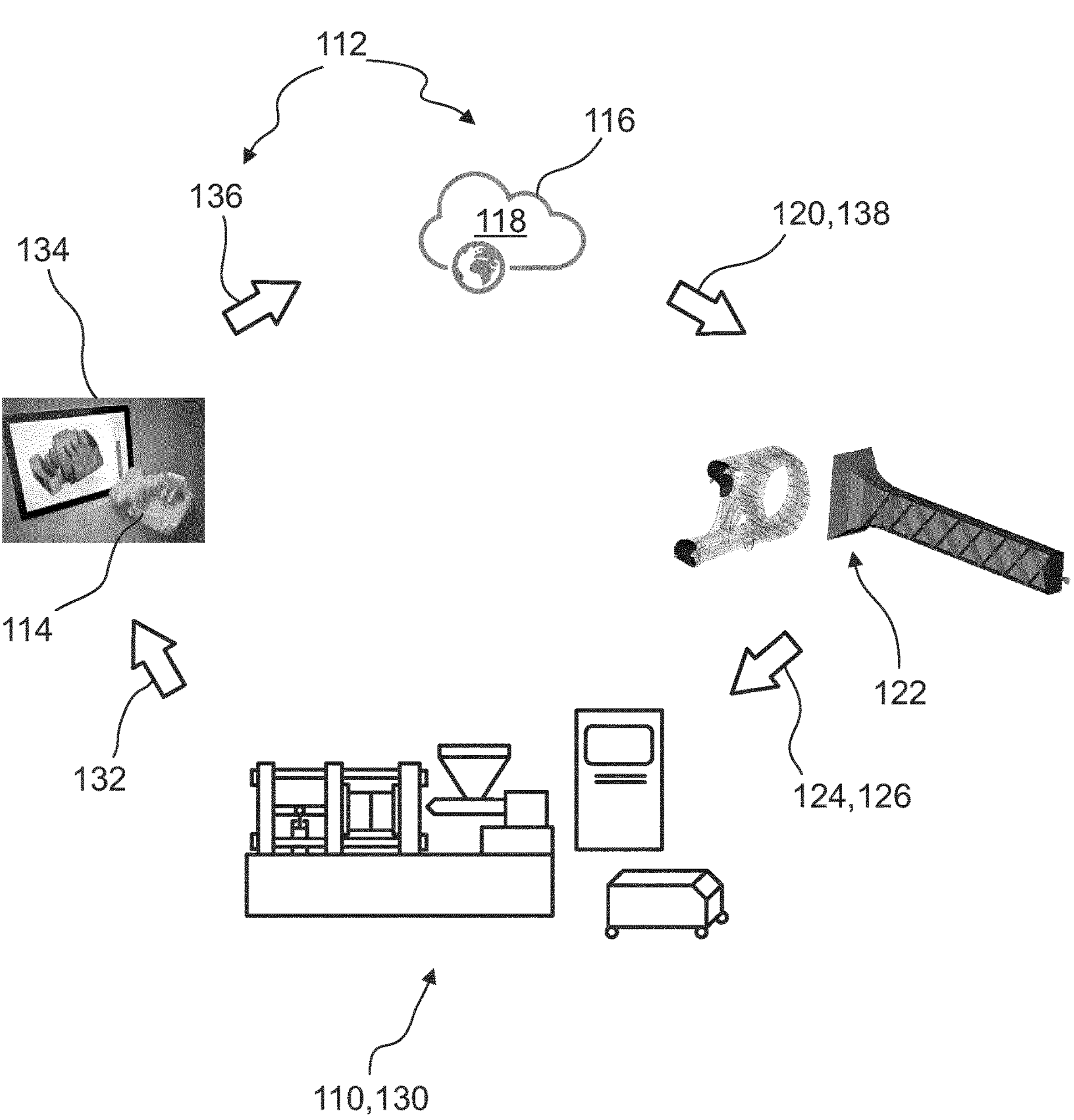

a) providing a set of input parameters by at least one external processing unit;
b) simulating an injection molding process based on the set of input parameters and determining at least one predicted process parameter of the simulated injection molding process;

(Continued)

c) performing at least one injection molding process using the injection molding machine; and d) determining at least one actual process parameter of the injection molding process and comparing the actual process parameter and the predicted process parameter and adapting the simulation model based on the comparison.

15 Claims, 2 Drawing Sheets

(52) U.S. Cl.
CPC ................. *B29C 2945/7604* (2013.01); *B29C 2945/76936* (2013.01); *B29C 2945/76949* (2013.01)

(58) Field of Classification Search
CPC ........... B29C 2945/76936; B29C 2945/76949; B29C 45/77; B29C 45/78; B29C 2945/76451; B29C 2945/76498; B29C 2945/76531; B29C 2945/76595; B29C 2945/76943; B29C 2945/76973; G06N 3/08; G06N 20/00
See application file for complete search history.

(56) References Cited

U.S. PATENT DOCUMENTS

| | | | | |
|---|---|---|---|---|
| 2006/0224540 | A1 | 10/2006 | Shioiri et al. | |
| 2018/0178430 | A1* | 6/2018 | Stoehr | G06F 30/20 |
| 2018/0181694 | A1* | 6/2018 | Springer | B29C 45/766 |
| 2021/0008774 | A1 | 1/2021 | Kruppa et al. | |

FOREIGN PATENT DOCUMENTS

| | | | |
|---|---|---|---|
| EP | 0368300 | A2 | 5/1990 |
| EP | 2679376 | A1 | 1/2014 |
| JP | 2004223819 | A | 8/2004 |
| WO | 2019106499 | A1 | 6/2019 |
| WO | 2019138118 | A1 | 7/2019 |
| WO | 2019138120 | A1 | 7/2019 |
| WO | 2019138122 | A1 | 7/2019 |

OTHER PUBLICATIONS

International Search Report and Written Opinion for corresponding PCT/EP2021/072589 mailed Oct. 12, 2021; 10 pages.

Tucker, "The 5 Types of Cloud Computing", Article published on Linkedin, 8 pages (2020).

Wang et al., "Clound Computing for Cloud Manufacturing: Benefits and Limitations", Journal of Manufacturing Science and Engineering, vol. 137, pp. 040901-1-040901-9 (2015).

* cited by examiner

COMPUTER-IMPLEMENTED METHOD FOR CONTROLLING AND/OR MONITORING AT LEAST ONE INJECTION MOLDING PROCESS

CROSS-REFERENCE TO RELATED APPLICATIONS

This application is a U.S. National Phase Application of International Patent Application No. PCT/EP2021/072589, filed Aug. 13, 2021, which claims priority to European Patent Application No. 20191130.2, filed Aug. 14, 2020, each of which is hereby incorporated by reference herein.

TECHNICAL FIELD

The invention relates to a computer-implemented method for controlling and/or monitoring at least one injection molding process, a computer program, a computer-readable storage medium and an automated control system. Such methods, systems and devices can, in general, be employed for technical design or configuration purposes e.g. in a development or production phase of an injection molding process. However, further applications are possible.

BACKGROUND ART

Injection molding processes are common manufacturing processes in recent small and large scale manufacturing industry. In typical injection molding processes plastic material, such as thermoplastic, thermosetting or elastomer material, is melted, usually in a heating process, and then injected into an empty die, e.g. under an applied pressure. The plastic material is then hardened, usually in a cooling or curing process, in order to remain in the form given by the die, thereby becoming the manufactured product. It allows reproduction of the products formed by the die in large quantities. Due to high costs for designing and configuring the die, the die cannot be easily modified if any problems occur during injection molding. Thus, in order to minimize production costs and waste, the filling process of the die or mold cavity is typically simulated before using common simulation methods.

Today injection molding simulation, for example from Moldflow, can be used to optimize a tool and the filling process for a given part. Moldflow has two core products: Moldflow Adviser which provides manufacturability guidance and directional feedback for standard part and mold design, and Moldflow Insight which provides definitive results for flow, cooling, and warpage along with support for specialized molding processes, see en.wikipedia.org/wiki/Moldflow.

It is known that optimization procedures can be implemented within the injection molding machine itself, e.g. from DE 10 2013 111 257 B3, DE 10 2018 107 233 A1 or EP3294519B1.

Despite the advantages involved in recent injection molding process optimization and simulation methods, several technical challenges remain. Thus, still, simulating and optimizing the injection molding process may be very time-consuming and complex, and required computation capacities may still be excessively high which may be impossible to be realized within the injection molding machine itself due to the fact that the injection molding machine has to produce workpieces no simulation results. Further, it would be desirable to even improve known simulation and optimization methods for injection molding with respect to efficiency and precision of the simulation and the optimization process.

On other technical fields such as for chemical processes further optimization methods are known such as described in WO 2019/138118, WO 2019/138120, WO 2019/138122.

U.S. Pat. No. 5,900,259 A describes a molding condition optimizing system for an injection molding machine comprising plastic flow condition optimizing section and an operating condition determining section. The plastic flow condition optimizing section carries out a plastic flow analysis on a molded part model, and determines an optimum flow condition in a filling stage and a packing stage of an injection molding process of the injection molding machine by repeatedly executing an automated calculation using the result of the plastic flow analysis and the plastic flow analysis itself. The operating condition determining section comprises an injection-side condition determining section for determining an optimum injection-side condition of the injection molding machine according to the optimum flow condition obtained by the plastic flow condition optimizing means and a knowledge database with respect to an injection condition, and a clamping-side condition determining section for determining an optimum clamping-side condition according to the molded part form data generated by the plastic flow condition optimizing means, the result of the plastic flow analysis, mold design data, and a knowledge database with respect to a mold clamping condition.

US 2018/181694 A1 describes a method of optimizing a process optimization system for a molding machine which includes setting a setting data by a user on the actual molding machine, obtaining first values for at least one descriptive variable of the molding process based on the setting data set and/or on the basis of the cyclically carried out molding process, and obtaining second values for the at least one descriptive variable based on data from the process optimization system. According to a predetermined differentiating criterion, it is checked whether the first values and the second values differ from each other. If the checking shows that the first values and the second values differ from each other, the process optimization system is modified such that, when applied to the molding machine and/or the molding process, the first values for the descriptive variable substantially result instead of the second values for the descriptive variable.

WO 2019/106499 A1 describes a method for processing molding parameters for an injection molding machine obtained by CAE. The CAE simulation generates simulation results, first machine parameters are generated by electronically processing the simulation results, second machine parameters are obtained, different from the first ones, from the execution of another molding process for the same object; and in an electronic database accessible by a user the first and second machine parameters are saved associating them in a common collection. In a further variation, the last method step is replaced by processing the first and second machine parameters with a software, and modifying the machine parameters calculated with a subsequent CAE simulation as a function of the processing produced by said software.

US 2006/224540 A1 describes test molding and mass-production molding which are performed by an injection molding machine that includes a control apparatus in which neural networks are used. A quality prediction function determined based on the test molding is revised as necessary during mass-production molding.

EP 0 368 300 A2 describes an optimum molding condition setting system for an injection molding machine. The system comprises a molten material flow analysis means for analyzing a resin flow, a resin cooling and a structure/strength of molded products by using a designed model mold and also comprises an analysis result evaluation means for determining an initial molding condition and its permissible range in accordance with the analysis results. The initial molding condition is set into the injection molding machine and a test shot is carried out in order to check for a deficiency of a molded product. If the deficiency of the molded product has found out, a data of the deficiency is entered into a molding defect elimination means.

Problem to be Solved

It is therefore desirable to provide means and methods which address the above mentioned technical challenges. Specifically, methods, systems, programs and databases shall be proposed for further improve performance of simulating and optimizing an injection molding process, compared to devices, methods and systems known in the art, in particular in terms of efficiency and precision.

SUMMARY

This problem is addressed by the methods, systems, programs and databases with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way.

The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the invention a computer-implemented method for controlling and/or monitoring at least one injection molding process in at least one injection molding machine is disclosed.

The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processor. The term "computer", thus, may generally refer to a device or to a combination or network of devices having at least one data processing means such as at least one processor. The computer, additionally, may comprise one or more further components, such as at least one of a data storage device, an electronic interface or a human-machine interface. The term "processor" or "processing unit" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math coprocessor or a numeric coprocessor, a plurality of registers, specifically registers configured for supplying operands to the ALU and storing results of operations, and a memory, such as an L1 and L2 cache memory. In particular, the processor may be a multicore processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) or the like.

The term "molding process" as used herein is a broad term and is to be given its ordinary and customary meaning to a person of ordinary skill in the art and is not to be limited to a special or customized meaning. The term specifically may refer, without limitation, to a process or procedure of shaping at least one material into an arbitrary form or shape. The term "injection molding process" as used herein is a broad term and is to be given its ordinary and customary meaning to a person of ordinary skill in the art and is not to be limited to a special or customized meaning. The term specifically may refer, without limitation, to a type of molding process performed by injecting molten material into a mold.

The term "mold" as used herein is a broad term and is to be given its ordinary and customary meaning to a person of ordinary skill in the art and is not to be limited to a special or customized meaning. The term specifically may refer, without limitation, to a die or form, e.g. a form giving matrix or frame. In particular, as used herein, the mold may refer to an arbitrary die and/or form comprising at least one cavity, such as at least one form giving structure and/or cut-out. The mold may specifically be used in the injection molding process, wherein at least one molten mass of material may be injected into the at least one cavity of the mold. For sake of simplicity, herein, the terms "mold" and "mold cavity" may be used interchangeably. As an example, the mold having the at least one cavity may be used in the molding process for forming the material.

In particular, the molten mass of material injected into the cavity of the mold may be given a negative form and/or geometry of the cavity. Specifically, the mold may be used for manufacturing at least one workpiece, also denoted as component, wherein the manufactured workpiece may have a negative form and/or shape of the mold cavity.

The molding process may be configured for manufacturing at least one workpiece. The term "workpiece" as used herein is a broad term and is to be given its ordinary and customary meaning to a person of ordinary skill in the art and is not to be limited to a special or customized meaning. The term specifically may refer, without limitation, to an arbitrary part or element. In particular, the workpiece may be or may comprise a constituent member of an arbitrary machine or apparatus. The workpiece may, for example, at least partially have a negative shape of the mold or of a cavity of the mold used in the molding process for manufacturing the component. Thus, the injection molding process may be or may refer to a form-giving procedure for creating the workpiece.

The term "injection molding machine" as used herein is a broad term and is to be given its ordinary and customary meaning to a person of ordinary skill in the art and is not to be limited to a special or customized meaning. The term specifically may refer, without limitation, to an arbitrary device or machine configured for performing the injection molding process. The injection molding machine may comprise at least one injection unit and at least one clamping unit.

The injection molding process is based on a plurality of process parameters. The term "process parameter" as used herein is a broad term and is to be given its ordinary and customary meaning to a person of ordinary skill in the art and is not to be limited to a special or customized meaning. The term specifically may refer, without limitation, to at least one settable and/or selectable and/or adjustable and/or configurable parameter influencing the injection molding process. The process parameters may relate to operating conditions of the injection molding machine. In particular, the process parameter may be an injection molding machine parameter. For example, the process parameters may comprise one or more of a polymer melt temperature, barrel temperature, injection unit temperature, a screw speed, an injection speed, a holding pressure, holding time, a cooling or curing time, at least one cooling or curing parameter such as cooling or curing medium throughput, or cooling or curing medium temperature. The injection molding machine parameter may further comprise dimensions of the machine such as clamping force, tie-bar gap, injection unit, equipment of the machine such as cylinder diameter or maximum cylinder temperature and the like.

The term "control" as used herein is a broad term and is to be given its ordinary and customary meaning to a person of ordinary skill in the art and is not to be limited to a special or customized meaning. The term specifically may refer, without limitation, to determining and/or adjusting at least one process parameter. The term "monitoring" as used herein is a broad term and is to be given its ordinary and customary meaning to a person of ordinary skill in the art and is not to be limited to a special or customized meaning. The term specifically may refer, without limitation, to quantitative and/or qualitative determining at least one process parameter.

The computer-implemented method comprises the following steps, which may be performed in the given order. However, a different order may also be possible. Further, one or more than one or even all of the steps may be performed once or repeatedly. Further, the method steps may be performed in a timely overlapping fashion or even in parallel. The method may further comprise additional method steps which are not listed.

The method comprises the following steps:

a) providing a set of input parameters by at least one external processing unit, wherein the set of input parameters comprises at least one simulation model, material specific parameters and injection molding machine parameters;
b) the external processing unit, simulating an injection molding process based on the set of input parameters and determining at least one predicted process parameter of the simulated injection molding process by applying an optimizing algorithm in terms of at least one optimization target on the simulation model, wherein the predicted process parameter is provided to the injection molding machine via at least one interface;
c) performing at least one injection molding process using the injection molding machine based on the predicted process parameter for generating at least one workpiece, determining at least one property of the generated workpiece and comparing the property with the optimization target, wherein, in case the property of the generated workpiece deviates from the optimization target, at least one process parameter of the injection molding machine is adapted depending on the comparison, and the injection molding process, determining of the property of the generated workpiece, and comparing the property with the optimization target is repeated with adapted process parameter until the property of the generated workpiece is in accordance with the optimization target at least within pre-defined tolerances;
d) determining at least one actual process parameter of the injection molding process and comparing the actual process parameter and the predicted process parameter and adapting the simulation model based on the comparison.

The term "external processing unit" as used herein is a broad term and is to be given its ordinary and customary meaning to a person of ordinary skill in the art and is not to be limited to a special or customized meaning. The term specifically may refer, without limitation, to at least one processing unit designed separately from the injection molding machine. The injection molding machine may comprise an internal processing unit, which, in particular, is configured for controlling and monitoring machine parameters. The external processing unit may be configured for transferring and/or receiving data to the internal processing unit via at least one communication interface. The internal processing unit may be configured to transfer and/or to receive data to the external processing unit via at least one communication interface. The external processing unit may comprise a plurality of processors. The external processing unit may be and/or comprises a cloud computing system.

The external processing unit may comprise at least one database. The term "database" as used herein is a broad term and is to be given its ordinary and customary meaning to a person of ordinary skill in the art and is not to be limited to a special or customized meaning. The term specifically may refer, without limitation, to an arbitrary collection of information. The database may be stored in at least one data storage device. In particular, the database may contain an arbitrary collection of information. The data storage device may be or may comprise at least one element selected from the group consisting of: at least one server, at least one server system comprising a plurality of servers, at least one cloud server or cloud computing infrastructure.

The term "communication interface" as used herein is a broad term and is to be given its ordinary and customary meaning to a person of ordinary skill in the art and is not to be limited to a special or customized meaning. The term specifically may refer, without limitation, to an item or element forming a boundary configured for transferring information. In particular, the communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information. The communication interface may specifically provide means for transferring or exchanging information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may be at least one web interface.

The term "providing" as used herein is a broad term and is to be given its ordinary and customary meaning to a person of ordinary skill in the art and is not to be limited to a special or customized meaning. The term specifically may refer, without limitation, to retrieving and/or selecting the set of input parameters. The term "retrieving" as used herein is a broad term and is to be given its ordinary and customary meaning to a person of ordinary skill in the art and is not to be limited to a special or customized meaning. The term specifically may refer, without limitation, to the process of a system, specifically a computer system, generating data and/or obtaining data from an arbitrary data source, such as from a data storage, from a network or from a further computer or computer system. The retrieving specifically may take place via at least one computer interface, such as via a port such as a serial or parallel port. The retrieving may comprise several sub-steps, such as the sub-step of obtaining one or more items of primary information and generating secondary information by making use of the primary information, such as by applying one or more algorithms to the primary information, e.g. by using a processor.

The term "set of input parameters" as used herein is a broad term and is to be given its ordinary and customary meaning to a person of ordinary skill in the art and is not to be limited to a special or customized meaning. The term specifically may refer, without limitation, to information about the simulation model, material specific parameters and injection molding machine parameters.

The term "injection molding machine parameters" as used herein is a broad term and is to be given its ordinary and customary meaning to a person of ordinary skill in the art and is not to be limited to a special or customized meaning. The term specifically may refer, without limitation, to parameters influencing the operating conditions of the injection molding machine. The injection molding machine parameters may comprise setting of machine components of the injection molding machine. The injection molding machine parameters may comprise specific values and/or parameter profiles. The injection molding machine parameters may comprise at least one parameter selected from the group consisting of: polymer melt temperature, barrel temperature, injection unit temperature, screw speed, injection speed, holding pressure, holding time, cooling or curing time, cooling or curing parameters such as cooling or curing medium throughput, cooling or curing medium temperature.

The term "material specific parameters" as used herein is a broad term and is to be given its ordinary and customary meaning to a person of ordinary skill in the art and is not to be limited to a special or customized meaning. The term specifically may refer, without limitation, to information about the material or materials used for the injection molding process. The material specific parameters may be provided by material suppliers and/or may be downloaded from a website or other database. Material suppliers may have a lot of product specific data, like rheological data, viscosity, and lot specific data for every material produced. The material specific parameters comprise at least one parameter selected from the group consisting of: compressibility, flow characteristics, temperature characteristics.

The material, specifically the material used in the molding process, e.g. for manufacturing the workpiece, may for example be or may comprise a plastic material. The term "plastic material" as used herein is a broad term and is to be given its ordinary and customary meaning to a person of ordinary skill in the art and is not to be limited to a special or customized meaning. The term specifically may refer, without limitation, to an arbitrary thermoplastic, thermosetting or elastomer material. In particular, the plastic material may be a mixture of substances comprising monomers and/or polymers. Specifically, the plastic material may be or may comprise a thermoplastic material. Additionally or alternatively, the plastic material may be or may comprise a thermosetting material. Additionally or alternatively, the plastic material may comprise an elastomer material. The material may specifically be in a molten state during the manufacturing of the workpiece.

The term "simulation" or "simulating" as used herein is a broad term and is to be given its ordinary and customary meaning to a person of ordinary skill in the art and is not to be limited to a special or customized meaning. The term specifically may refer, without limitation, to a process for, specifically approximately, imitating of the real injection molding process. The term "simulation model" as used herein is a broad term and is to be given its ordinary and customary meaning to a person of ordinary skill in the art and is not to be limited to a special or customized meaning. The term specifically may refer, without limitation, to at least one model based on which the simulation is performed. The simulation model may be generated by the software on the external processing unit or the simulation model may be a data set in the software.

The simulation model may comprise at least one trained and trainable model. The term "trained model" as used herein is a broad term and is to be given its ordinary and customary meaning to a person of ordinary skill in the art and is not to be limited to a special or customized meaning.

The term specifically may refer, without limitation, to a mathematical model trained on at least one training data set. The term "trainable model" as used herein is a broad term and is to be given its ordinary and customary meaning to a person of ordinary skill in the art and is not to be limited to a special or customized meaning. The term specifically may refer, without limitation, to the fact that the simulation model can be further trained and/or updated based on additional training data. Specifically, the simulation model is trained on a training dataset. The simulation model may be trained by using machine learning. The simulation model may be at least partially data-driven by being trained on data from historical production runs. The term "data driven" as used herein is a broad term and is to be given its ordinary and customary meaning to a person of ordinary skill in the art and is not to be limited to a special or customized meaning. The term specifically may refer, without limitation, to the fact that the model is an empirical, predictive model. Specifically, the data driven model is derived from analysis of experimental data of previous injection molding processes. The term "historical production run" refers to injection molding processes in the past or at an earlier time point Specifically, for further training of the simulation model, the training data set may be generated from comparison data of actual and predicted process parameter as determined in step d). As used herein, the term "at least partially data-driven model" is a broad term and is to be given its ordinary and customary meaning to a person of ordinary skill in the art and is not to be limited to a special or customized meaning.

The term specifically may refer, without limitation, to the fact that the trained model comprises data-driven model parts, wherein it is possible that the model comprises further or other model parts. The term "machine-learning" as used herein is a broad term and is to be given its ordinary and customary meaning to a person of ordinary skill in the art and is not to be limited to a special or customized meaning. The term specifically may refer, without limitation, to a method of using artificial intelligence (AI) for automatically model building of machine-learning models, in particular of prediction models. The external processing unit may be configured for performing and/or executing at least one machine-learning algorithm. The simulation model may be based on the results of at least one machine-learning algorithm. The machine-learning algorithm may comprise decision trees, naive bayes classifications, nearest neighbors, neural networks, convolutional neural networks, generative adversarial networks, support vector machines, linear regression, logistic regression, random forest and/or gradient boosting algorithms. Preferably, the machine-learning algorithm is organized to process an input having a high dimensionality into an output of a much lower dimensionality. Such a machine-learning algorithm is termed "intelligent" because it is capable of being "trained". The algorithm may be trained using records of training data. A record of training data may comprise training input data and corresponding training output data. The training output data of a record of training data may be the result that is expected to be produced by the machine-learning algorithm when being given the training input data of the same record of training data as input. The deviation between this expected result and the actual result produced by the algorithm may be observed and rated by means of a "loss function". This loss function may be used as a feedback for adjusting the parameters of the internal processing chain of the machine-learning algorithm. For example, the parameters may be adjusted with the optimization goal of minimizing the values of the loss function that result when all training input data is fed into the machine-learning algorithm and the outcome is compared with the corresponding training output data. The result of this training may be that given a relatively small number of records of training data as "ground truth", the machine-learning algorithm is enabled to perform its job well for a number of records of input data higher by many orders of magnitude. Thus, the simulation model may comprise at least one algorithm and model parameters. Parameters of the simulation model may be generated by using at least one artificial neural network. The simulation model, in particular model parameters, may be adapted, and thus, may be further trained, in step d).

The simulation model may comprise a digital twin of the injection molding process. The simulation model is configured for simulating an injection modeling process. The simulation model may comprise a filling simulation. Specifically, the simulation model may be configured for simulating of a filling of the mold cavity with a molten mass of at least one material. The simulation model may be configured for simulating of a manufacturing of the workpiece. The simulation model may be configured for simulating geometry and/or shape of the workpiece. The simulation model may comprise a strength analysis.

The simulation model may use geometrical data of a workpiece to be manufactured. The term "geometrical data" as used herein is a broad term and is to be given its ordinary and customary meaning to a person of ordinary skill in the art and is not to be limited to a special or customized meaning. The term specifically may refer, without limitation, to information on a three-dimensional form or shape of an arbitrary object or element. Specifically, the geometrical data, such as the information on a three-dimensional shape, may be present in a computer-readable form, such as in a computer compatible data set, specifically a digital data set. As an example, the geometrical data may be or may comprise computer-aided-design-data (CAD data). Specifically, three-dimensional geometrical data may be or may comprise CAD data describing the form or shape of the object or element.

The simulation model may be configured for considering material specific properties. The simulation model may comprise a digital twin of the material. The simulation model may be configured for considering batch properties of raw material batches such as viscosity of the material batch. The simulation process is not performed on the injection molding machine itself, but is performed by the external processing unit such as by at least one cloud computing system. This may allow taking into account, in addition to machine parameters and/or sensor parameters provided by the injection molding machine and/or at least one sensor thereof and/or available in the injection molding machine, additional parameters influencing the injection molding process.

These additional parameters may relate to external knowledge e.g. knowledge of a material supplier, such as product specific data, like rheological data, viscosity, and/or algorithms, and/or specific data for produced material.

Using simulation data, process data and product related data in a cloud based process optimizing of the injection molding process may be possible. As outlined above, material suppliers may have a lot of product specific data, like rheological data, viscosity, and lot specific data for every material produced. The present invention proposes a closed loop between the simulation and the injection molding process such that parameters from the simulation can directly be used in the injection molding process. Moreover, the other way round, process data can be used to optimize the modelling process using machine learning models. The lot specific information of the material may be further linked to the simulation the manufacturing process by using a cloud based digital twin of the material and the injection molding process such that the efficiency of the injection molding process can be even further improved.

As used herein, the term "predicted process parameter of the simulated injection molding process" is a broad term and is to be given its ordinary and customary meaning to a person of ordinary skill in the art and is not to be limited to a special or customized meaning. The term specifically may refer, without limitation, to expected values of the process parameters, in particular for reaching an optimal manufacturing result and/or optimal usage of resources. The predicted process parameter may be a parameter influencing the injection molding process. The predicted process parameter may be determined for optimizing the injection molding process. In known systems and devices, such as described in U.S. Pat. No. 5,900,259 A, the optimization is performed in view of workpiece optimization. In contrast, the present invention refers to process optimization.

The process optimization may, in addition to optimal manufacturing result, take into account optimal usage of resources.

Step b) may comprise at least one optimization step. The term "optimization", as used herein, is a broad term and is to be given its ordinary and customary meaning to a person of ordinary skill in the art and is not to be limited to a special or customized meaning. The term specifically may refer, without limitation, to the process of selecting of a best parameter set with regard to the optimization target from a parameter space of possible parameters. The term "optimization target", as used herein, is a broad term and is to be given its ordinary and customary meaning to a person of ordinary skill in the art and is not to be limited to a special or customized meaning.

The term specifically may refer, without limitation, to at least one criterion under which the optimization is performed. The optimization target may comprise at least one optimization goal and accuracy and/or precision. The optimization target may be at least one property of the workpiece. The property of the workpiece may be at least one element selected from the group consisting of: weight of the workpiece, dimensions of the workpiece, warping. The optimization target may be pre-specified such as by at least one customer and/or at least one user of the injection molding machine. The optimization target may be at least one user's specification. The user may select the optimization goal and a desired accuracy and/or precision. The predicted process parameter is provided to the injection molding machine via at least one interface, in particular via a communication interface. In known systems and devices, such as described in U.S. Pat. No. 5,900,259 A, the parameters defining the injection molding process are stored in the injection molding machine. Thus, usually, the parameters are static. In contrast, the present invention proposes a self-learning method, and in particular, continuous improvement of the performance of injection molding process, by adapting the simulation model in step d) taking into account newly determined predicted process parameter in step c) and using the improved simulation model for predicting improved process parameters for performing the at least one injection molding process in step c). Therefore, a cycle or loop is proposed by performing steps a) to d).

The method comprises performing at least one injection molding process using the injection molding machine based on the predicted process parameter for generating at least one workpiece. Using the predicted process parameter for performing the injection molding process may refer to not only relying on machine parameters and/or sensor parameters provided by the injection molding machine and/or at least one sensor thereof and/or available in the injection molding machine but to take into account in addition external knowledge e.g. knowledge of a material supplier such as product specific data, like rheological data, viscosity, and/or algorithms, and/or specific data for produced material. Using the predicted process parameter may allow continuously improving the injection molding process. The manufactured workpiece may be measured, e.g. by using optical or tactile measurement techniques such as scanning. The term "scanning" as used herein is a broad term and is to be given its ordinary and customary meaning to a person of ordinary skill in the art and is not to be limited to a special or customized meaning. The term specifically may refer, without limitation, to an arbitrary process or procedure of examining an arbitrary object or data. The scanning may comprise determining shape and dimensions of the workpiece. The scanning may specifically be performed automatically. The scanning may be performed autonomously by a computer or computer network.

The determined property of the workpiece may be compared to the optimization target. The comparison may comprise determining deviation from a target-shape and/or target-dimensions, also denoted target-size. The generated workpiece is considered to deviate from the target-shape and/or target-dimensions if a difference of the determined property and the optimization target is above a tolerance limit. The tolerance limit may depend on accuracy such as of the determining of the property and/or customer requirements and the like.

In case the property of the generated workpiece deviates from the optimization target, at least one process parameter of the injection molding machine is adapted depending on the comparison.

For example, the comparison of the determined property of the workpiece with the optimization target may reveal that the workpiece deviates from the desired shape and that, it in particular exhibits twisting, warping, wavy surfaces and angle deviations. The cause for this may be a different shrinkage tendency (shrinkage potential) of the various areas of the workpiece. The shrinkage differences may be caused by different degrees of packing in different areas of the workpiece as well as by different orientations of fibers and polymer chains. Further causes may be that the selected mold temperatures are unfavorable, that the molded workpiece has different wall thicknesses, that the pressure gradient of the workpiece is too high along the flow path, that the selected cooling time is too short so that the workpiece is removed from the mold at a too high temperature and the workpiece becomes deformed after being removed from the mold, that an unfavorable material is being used, or that glass fibers of glass fiber-reinforced thermoplastics are oriented predominantly in the flow direction. In the latter case deviations may occur if the orientation of the glass fibers changes from place to place. The causes for this are for example, deflections in the flow, orientation effects at the end of the flow path, at weld lines and at gates. At least one of the following process parameters of the injection molding machine may be adapted as follows depending on the comparison: changing temperatures for the mold halves and sliding cores, increasing the cooling time, adapting the process such that the molding is not catching or being held with negative draft, changing the holding pressure, and changing the holding time. Moreover, in view of the comparison the materials used may be changed. Specifically using low-warpage materials, e. g. blends with an amorphous phase, may be used. Moreover, the workpiece design may be changed. The process parameters of the injection molding machine may be adapted with respect to a predetermined hierarchy. For example, first the mold temperature may be adapted, then the cooling time may be adapted. Subsequently the further process parameters may be adapted.

For example, the comparison of the determined property of the workpiece with the optimization target may reveal that the workpiece comprises at least one sink mark. The term "sink mark" as used herein is a broad term and is to be given its ordinary and customary meaning to a person of ordinary skill in the art and is not to be limited to a special or customized meaning. The term specifically may refer, without limitation, to indentations in the surface of the molded workpiece.

Sink marks may occur mainly where there is an increase in a wall section. This may cause a local increase in volume shrinkage, which pulls a surface layer inwards. Sink marks may sometimes only occur after ejection from the mold when the hot centre of the polymer heats up the edge layers that have already cooled off, causing them to yield. Sometimes they can only be recognized by the gloss difference in comparison to the surrounding areas. Sink marks may have several reasons such as they occur if the volume contraction during the cooling phase is not sufficiently compensated for by the holding pressure, or the design of the workpiece is not appropriate for processing this plastic (e. g. material sections with an increase in wall thickness, sudden changes in the wall thickness along the flow path), or there is no melt cushion, or a large pressure loss has occurred in the machine nozzle and/or in the gating system or the workpiece is gated into a thin wall. At least one of the following process parameters of the injection molding machine may be adapted as follows depending on the comparison: increasing the holding pressure, increasing the holding time, reducing the melt temperature, decrease the mold temperature, changing pressure transfer long each flow path by changing the wall thicknesses of the molded workpiece, lengthening metering stroke and adjust the change-over point as necessary, adapting a sealing function of a non-return valve, adapting barrel wear and enlarge the flow cross sections of the runner and gating system, adapting position of the workpiece such as in the area where the wall section is the greatest. Moreover, the workpiece design may be changed. The process parameters of the injection molding machine may be adapted with respect to a pre-determined hierarchy. For example, first the holding pressure may be adapted, then the holding time, then the melt temperature and subsequently the further process parameters.

The injection molding process, determining of the property of the generated workpiece, and comparing the property with the optimization target is repeated with adapted process parameter until the property of the generated workpiece is in accordance with the optimization target at least within pre-defined tolerances.

Step d) comprises determining at least one actual process parameter of the injection molding process. The injection molding machine may be configured for measuring and/or monitoring process at least one process parameter during the injection molding process. The at least one actual process parameter may be at least one process parameter which is measurable and/or monitorable during the injection molding process, e.g. by using at least one sensor. The term "during the injection molding process" may refer to the time span between start and end of the injection molding process and/or a time span in which process conditions are expected to be essentially comparable to process conditions during the injection molding process. The injection molding machine may be configured for measuring the process parameters in real time and to adapt the process parameters on the run. The injection molding machine may be configured for measuring the at least one actual process parameter in real time. The injection molding machine may be configured for adapting the at least one actual process parameter on the run. In case step c) comprises determining a plurality of predicted process parameters, step d) may comprise determining a plurality of process parameters such as a set of process parameters defining the injection molding process. The injection molding machine may comprise at least one sensor. Measured parameters of the injection molding machine may be registered and transferred to the external processing unit. The injection molding machine may comprise at least one element selected from the group consisting of: a temperature sensor; a pressure sensor; a clock. For example, the at least one actual process parameter may be at least one parameter selected from the group consisting of a polymer melt temperature, barrel temperature, injection unit temperature, a screw speed, an injection speed, a holding pressure, holding time, a cooling or curing time, at least one cooling or curing parameter such as cooling or curing medium throughput, or cooling or curing medium temperature. Step d) may comprise determining a set of actual process parameters which are to be optimized, in particular actual process parameters corresponding to the process parameters predicted in step c). Thus, not only a single process parameter may be used during the optimization cycle but a plurality of process parameters, in particular a set of process parameters defining the injection molding process, may be used.

Step d) further comprises comparing the actual process parameter and the predicted process parameter and adapting the simulation model based on the comparison. In case a plurality of predicted process parameters is determined in step c), step d) further may comprise comparing the respective actual process parameter and the respective predicted process parameter and adapting the simulation model based on the comparison. The comparison may comprise determining deviation of the predicted process parameter from the actual process parameter or view versa. The actual process parameter is considered to deviate from the predicted process parameter if a difference is above a tolerance limit. The tolerance limit may depend on measurement accuracy. The comparison may be performed by the internal processing unit of the injection molding machine. The information about the deviation and/or the actual process parameters may be transferred to the external processing unit. The external processing unit may be configured for adapting the simulation model, in particular the model parameters, based on the information about the deviation and/or the actual process parameters.

The method further may comprise outputting the predicted process parameter and/or a result of the comparison of the actual process parameter and the predicted process parameter via at least one output interface or port. The output may comprise the set of predicted process parameters and/or results of the comparisons of the actual process parameters and the predicted process parameters. The term "outputting" as used herein is a broad term and is to be given its ordinary and customary meaning to a person of ordinary skill in the art and is not to be limited to a special or customized meaning. The term specifically may refer, without limitation, to the process of making information available to another system, data storage, person or entity. As an example, the output may take place via one or more interfaces, such as a computer interface or a human-machine interface. The output, as an example, may take place in one or more of a computer-readable format, a visible format or an audible format. For example, the outputting may be performed via at least one display, at least one microphone and the like.

Method steps a) to d) may be repeated, wherein the adapted simulation model may be used in step a).

In a further aspect of the invention, a computer program comprising instructions which, when the program is executed by a computer or computer system, cause the computer or computer system to carry out the method, in particular steps a) to d), according to the invention. For possible definitions of most of the terms used herein, reference may be made to the description of the computer-implemented method above or as described in further detail below.

Specifically, the computer program may be stored on a computer-readable data carrier and/or on a computer-readable storage medium. As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Further disclosed and proposed herein is a computer program product comprising instructions which, when the program is executed by a computer or computer system, cause the computer or computer system to carry out the computer implemented method, as described above or as described in further detail below. Thus, for possible definitions of most of the terms used herein, again reference may be made to the description of the method as disclosed in the first aspect of the present invention.

In particular, the computer program product may comprise program code means stored on a computer-readable data carrier, in order to perform the method according to one or more of the embodiments disclosed herein, when the program is executed on a computer or computer network. As used herein, a computer program product refers to the program as a tradable product.

The product may generally exist in an arbitrary format, such as in a paper format, or on a computer-readable data carrier. Specifically, the computer program product may be distributed over a data network.

Further disclosed and proposed herein is a computer-readable storage medium comprising instructions which, when executed by a computer or computer system, cause the computer or computer system to carry out the computer-implemented method as described above or as described in further detail below. Thus, for possible definitions of most of the terms used herein, again reference may be made to the description of the method as disclosed in the first aspect of the present invention.

In a further aspect, an automated control system for an injection molding process in at least one injection molding machine is disclosed. The injection molding process is based on a plurality of process parameters.

The control system comprises at least one external processing unit is configured for simulating an injection molding process based on a set of input parameters comprising at least one simulation model, material specific parameters and injection molding machine parameters by applying an optimizing algorithm in terms of at least one optimization target on the simulation model.

The control system comprises at least one interface configured for providing the predicted process parameter to the injection molding machine. The control system is configured for performing at least one injection molding process using the injection molding machine based on the predicted process parameter for generating at least one workpiece. The control system is configured for determining at least one property of the generated workpiece, for comparing the property with the optimization target and for adapting at least one process parameter of the injection molding machine depending on the comparison. The control system is configured for repeating the injection molding process, the determining of the property, the comparing of the property and the optimization target and the adapting of the process parameters until the property of the generated workpiece is in accordance with the optimization target at least within predefined tolerances.

The control system is configured for determining at least one actual process parameter of the injection molding process. The control system is configured for comparing the actual process parameter and the predicted process parameter and for adapting the simulation model based on the comparison.

The automated control system may be configured for performing the method according to the present invention. Thus, for possible definitions of most of the terms used herein, again reference may be made to the description of the method as disclosed in the first aspect of the present invention.

The methods, systems and programs of the present invention have numerous advantages over methods, systems and programs known in the art. In particular, the methods, systems and programs as disclosed herein may improve the performance of injection molding processes, compared to devices, methods and systems known in the art. The simulation can run on cloud solutions. The present invention proposes that in the cloud the simulation model is run to identify optimum parameters (to be process), and that this information can be linked to the actual parameters (as is process) such that a quick and efficient estimation loop is run. By means of a digital identity, the simulation model can also take into account material specific properties to improve even more the simulation.

Summarizing and without excluding further possible embodiments, the following embodiments may be envisaged:

Embodiment 1 A computer-implemented method for controlling and/or monitoring at least one injection molding process in at least one injection molding machine, wherein the injection molding process is based on a plurality of process parameters, wherein the method comprises the following steps:

a) providing a set of input parameters by at least one external processing unit, wherein the set of input parameters comprises at least one simulation model, material specific parameters and injection molding machine parameters;
b) the external processing unit, simulating an injection molding process based on the set of input parameters and determining at least one predicted process parameter of the simulated injection molding process by applying an optimizing algorithm in terms of at least one optimization target on the simulation model, wherein the predicted process parameter is provided to the injection molding machine via at least one interface;
c) performing at least one injection molding process using the injection molding machine based on the predicted process parameter for generating at least one workpiece, determining at least one property of the generated workpiece and comparing the property with the optimization target, wherein, in case the property of the generated workpiece deviates from the optimization target, at least one process parameter of the injection molding machine is adapted depending on the comparison, and the injection molding process, determining of the property of the generated workpiece, and comparing the property with the optimization target is repeated with adapted process parameter until the property of the generated workpiece is in accordance with the optimization target at least within pre-defined tolerances;

d) determining at least one actual process parameter of the injection molding process and comparing the actual process parameter and the predicted process parameter and adapting the simulation model based on the comparison.

Embodiment 2 The method according to the preceding embodiment, wherein method steps a) to d) are repeated, wherein the adapted simulation model is used in step a).

Embodiment 3 The method according to any one of the preceding embodiments, wherein the injection molding machine parameters comprise at least one parameter selected from the group consisting of: polymer melt temperature, barrel temperature, injection unit temperature, screw speed, injection speed, holding pressure, holding time, cooling or curing time, cooling or curing parameters.

Embodiment 4 The method according to any one of the preceding embodiments, wherein measured parameters of the injection molding machine are registered and transferred to the external processing unit, wherein the injection molding machine comprises at least one element selected from the group consisting of: a temperature sensor; a pressure sensor; a clock.

Embodiment 5 The method according to any one of the preceding embodiments, wherein the simulation model comprises a filling simulation.

Embodiment 6 The method according to any one of the preceding embodiments, wherein the simulation model is configured for simulating a filling of a mold cavity with a molten mass of at least one material.

Embodiment 7 The method according to any one of the preceding embodiments, wherein the simulation model is configured for simulating geometry and/or shape of the workpiece.

Embodiment 8 The method according to any one of the preceding embodiments, wherein the simulation model comprises a strength analysis.

Embodiment 9 The method according to any one of the preceding embodiments, wherein the material specific parameters comprise at least one parameter selected from the group consisting of: compressibility, flow characteristics, temperature characteristics.

Embodiment 10 The method according to any one of the preceding embodiments, wherein the simulation model is configured for considering material specific properties.

Embodiment 11 The method according to the preceding embodiment, wherein the simulation model is configured for considering batch properties of raw material batches.

Embodiment 12 The method according to any one of the preceding embodiments, wherein the property of the workpiece is at least one element selected from the group consisting of: weight of the workpiece, dimensions of the workpiece, warping.

Embodiment 13 The method according to any one of the preceding embodiments, wherein the optimization target is at least one property of the workpiece.

Embodiment 14 The method according to any one of the preceding embodiments, wherein the method further comprises outputting the predicted process parameter and/or a result of the comparison of the actual process parameter and the predicted process parameter via at least one output interface or port.

Embodiment 15 The method according to any one of the preceding embodiments, wherein parameters of the simulation model are generated by using at least one artificial neural network.

Embodiment 16 The method according to any one of the preceding embodiments, wherein the external processing unit is and/or comprises a cloud computing system.

Embodiment 17 A computer program comprising instructions which, when the program is executed by a computer or computer system, cause the computer or computer system to carry out the method according to any one of the preceding embodiments.

Embodiment 18 A computer-readable storage medium comprising instructions which, when executed by a computer or computer network, cause to carry out the method according to any one of the preceding embodiments referring to a method.

Embodiment 19 Automated control system for an injection molding process in at least one injection molding machine, wherein the injection molding process is based on a plurality of process parameters, wherein the control system comprises at least one external processing unit, wherein the external processing unit is configured for simulating an injection molding process based on a set of input parameters comprising at least one simulation model, material specific parameters and injection molding machine parameters by applying an optimizing algorithm in terms of at least one optimization target on the simulation model, wherein the control system comprises at least one interface configured for providing the predicted process parameter to the injection molding machine, wherein the control system is configured for performing at least one injection molding process using the injection molding machine based on the predicted process parameter for generating at least one workpiece, wherein the control system is configured for determining at least one property of the generated workpiece, for comparing the property with the optimization target and for adapting at least one process parameter of the injection molding machine depending on the comparison, wherein the control system is configured for repeating the injection molding process, the determining of the property, the comparing of the property and the optimization target and the adapting of the process parameters until the property of the generated workpiece is in accordance with the optimization target at least within pre-defined tolerances, wherein the control system is configured for determining at least one actual process parameter of the injection molding process, wherein the control system is configured for comparing the actual process parameter and the predicted process parameter and for adapting the simulation model based on the comparison.

Embodiment 20 The automated control system according to the preceding embodiment, wherein the automated control system is configured for performing the method according to any one of the preceding embodiments referring to a method.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures.

Therein, identical reference numbers in these Figures refer to identical or functionally comparable elements.

In the Figures:

FIG. 1 shows an exemplary embodiment of a computer-implemented method for controlling and/or monitoring at least one injection molding process in at least one injection molding machine and of an automated control system; and FIGS. 2A to 2D show experimental results.

DETAILED DESCRIPTION OF THE EMBODIMENTS

FIG. 1 shows an exemplary embodiment of a computer-implemented method for controlling and/or monitoring at least one injection molding process in at least one injection molding machine 110 and of an automated control system 112.

The injection molding machine 110 is configured for performing at least one injection molding process. The injection molding process may comprise at least one process or procedure of shaping at least one material into an arbitrary form or shape. The injection molding process may be a molding process performed by injecting molten material into a mold. The mold may be a die or form, e.g. a form giving matrix or frame. In particular, as used herein, the mold may refer to an arbitrary die and/or form comprising at least one cavity, such as at least one form giving structure and/or cut-out. The mold may specifically be used in the injection molding process, wherein at least one molten mass of material may be injected into the at least one cavity of the mold. As an example, the mold having the at least one cavity may be used in the molding process for forming the material. In particular, the molten mass of material injected into the cavity of the mold may be given a negative form and/or geometry of the cavity. Specifically, the mold may be used for manufacturing at least one workpiece 114, wherein the manufactured workpiece may have a negative form and/or shape of the mold cavity.

The molding process may be configured for manufacturing at least one workpiece 114. The workpiece 114 may be an arbitrary part or element. In particular, the workpiece 114 may be or may comprise a constituent member of an arbitrary machine or apparatus. The workpiece 114 may, for example, at least partially have a negative shape of the mold or of a cavity of the mold used in the molding process for manufacturing the component. Thus, the injection molding process may be or may refer to a form-giving procedure for creating the workpiece 114.

The injection molding process is based on a plurality of process parameters. The process parameters may be settable and/or selectable and/or adjustable and/or configurable parameter influencing the injection molding process. The process parameters may relate to operating conditions of the injection molding machine 110. In particular, the process parameter may be an injection molding machine parameter. For example, the process parameters may comprise one or more of a polymer melt temperature, barrel temperature, injection unit temperature, a screw speed, an injection speed, a holding pressure, holding time, a cooling or curing time, at least one cooling or curing parameter such as cooling or curing medium throughput, or cooling or curing medium temperature.

The method comprises the following steps:

a) (denoted with reference number 116) providing a set of input parameters by at least one external processing unit 118, wherein the set of input parameters comprises at least one simulation model, material specific parameters and injection molding machine parameters;

b) (denoted with reference number 120) the external processing unit 118, simulating an injection molding process based on the set of input parameters and determining at least one predicted process parameter of the simulated injection molding process 122 by applying an optimizing algorithm in terms of at least one optimization target on the simulation model, wherein the predicted process parameter is provided (denoted with reference number 124) to the injection molding machine 110 via at least one interface 126;

c) performing (denoted with reference number 130) at least one injection molding process using the injection molding machine 110 based on the predicted process parameter for generating at least one workpiece 114, determining at least one property of the generated workpiece 114 and comparing (denoted with reference number 132) the property with the optimization target, wherein, in case the property of the generated workpiece 114 deviates from the optimization target, at least one process parameter of the injection molding machine 110 is adapted depending on the comparison, and the injection molding process, determining of the property of the generated workpiece 114, and comparing the property with the optimization target is repeated with adapted process parameter until the property of the generated workpiece 114 is in accordance with the optimization target at least within predefined tolerances;

d) (denoted with reference number 134) determining at least one actual process parameter of the injection molding process and comparing the actual process parameter and the predicted process parameter and adapting (denoted with reference number 136) the simulation model based on the comparison.

The external processing unit 118 may be at least one processing unit designed separately from the injection molding machine 110. The injection molding machine 110 may comprise an internal processing unit, not shown here, which, in particular, is configured for controlling and monitoring machine parameters. The external processing unit 118 may be configured for transferring and/or receiving data to the internal processing unit via at least one communication interface.

The internal processing unit may be configured to transfer and/or to receive data to the external processing unit via at least one communication interface. The external processing unit 118 may comprise a plurality of processors. The external processing unit 118 may be and/or comprises a cloud computing system.

The external processing unit 118 may comprise at least one database. The database may be an arbitrary collection of information. The database may be stored in at least one data storage device. The external processing unit 118 may comprise the at least one data storage device with the information stored therein. In particular, the database may contain an arbitrary collection of information. The data storage device may be or may comprise at least one element selected from the group consisting of: at least one server, at least one server system comprising a plurality of servers, at least one cloud server or cloud computing infrastructure.

The providing 116 of the set of input parameters may comprise retrieving and/or selecting the set of input parameters. The retrieving may comprise a process of a system, specifically a computer system, generating data and/or obtaining data from an arbitrary data source, such as from a data storage, from a network or from a further computer or computer system. The retrieving specifically may take place via at least one computer interface, such as via a port such as a serial or parallel port. The retrieving may comprise several sub-steps, such as the sub-step of obtaining one or more items of primary information and generating secondary information by making use of the primary information, such as by applying one or more algorithms to the primary information, e.g. by using a processor.

The set of input parameters may comprise information about the simulation model, material specific parameters and injection molding machine parameters. The injection molding machine parameters may be parameters influencing the operating conditions of the injection molding machine. The injection molding machine parameters may comprise setting of machine components of the injection molding machine 110. The injection molding machine parameters may comprise specific values and/or parameter profiles. The injection molding machine parameters may comprise at least one parameter selected from the group consisting of: polymer melt temperature, barrel temperature, injection unit temperature, screw speed, injection speed, holding pressure, holding time, cooling or curing time, cooling or curing parameters such as cooling or curing medium throughput, cooling or curing medium temperature. The injection molding machine parameters may further comprise dimensions of the machine such as clamping force, tie-bar gap, injection unit, equipment of the machine such as cylinder diameter or maximum cylinder temperature and the like.

The material specific parameters may be information about the material or materials used for the injection molding process. The material specific parameters may be provided by material suppliers and/or may be downloaded from a website or other database. Material suppliers may have a lot of product specific data, like rheological data, viscosity, and lot specific data for every material produced. The material specific parameters comprise at least one parameter selected from the group consisting of: compressibility, flow characteristics, temperature characteristics.

The material, specifically the material used in the molding process, e.g. for manufacturing the workpiece, may for example be or may comprise a plastic material. Specifically, the plastic material may be or may comprise a thermoplastic material. Additionally or alternatively, the plastic material may be or may comprise a thermosetting material. Additionally or alternatively, the plastic material may comprise an elastomer material. The material may specifically be in a molten state during the manufacturing of the workpiece 114.

The simulation model may be generated by the software on the external processing unit 118 or the simulation model may be a data set in the software. The simulation model may comprise at least one trained and trainable model. The external processing unit 118 may be configured for performing and/or executing at least one machine-learning algorithm. The simulation model may be based on the results of at least one machine-learning algorithm. The machine-learning algorithm may comprise decision trees, naive bayes classifications, nearest neighbors, neural networks, convolutional neural networks, generative adversarial networks, support vector machines, linear regression, logistic regression, random forest and/or gradient boosting algorithms.

Preferably, the machine-learning algorithm is organized to process an input having a high dimensionality into an output of a much lower dimensionality. The algorithm may be trained using records of training data. The simulation model may comprise at least one algorithm and model parameters. Parameters of the simulation model may be generated by using at least one artificial neural network. The simulation model, in particular model parameters, may be adapted, and thus, may be further trained, in step d).

The simulation model may comprise a digital twin of the injection molding process. The simulation model is configured for simulating an injection modeling process. The simulation model may comprise a filling simulation. Specifically, the simulation model may be configured for simulating of a filling of the mold cavity with a molten mass of at least one material. The simulation model may be configured for simulating of a manufacturing of the workpiece. The simulation model may be configured for simulating geometry and/or shape of the workpiece. The simulation model may comprise a strength analysis.

The simulation model may be configured for considering material specific properties. The simulation model may comprise a digital twin of the material. The simulation model may be configured for considering batch properties of raw material batches such as viscosity of the material batch.

Using simulation data, process data and product related data in a cloud based process optimizing of the injection molding process may be possible. As outlined above, material suppliers may have a lot of product specific data, like rheological data, viscosity, and lot specific data for every material produced. The present invention proposes a closed loop between the simulation and the injection molding process such that parameters from the simulation can directly be used in the injection molding process. Moreover, the other way round, process data can be used to optimize the modelling process using machine learning models. The lot specific information of the material may be further linked to the simulation of the manufacturing process by using a cloud based digital twin of the material and the injection molding process such that the efficiency of the injection molding process can be even further improved.

The predicted process parameter of the simulated injection molding process 122 may be expected values of the process parameters, in particular for reaching an optimal manufacturing result and/or optimal usage of resources.

Step b) may comprise at least one optimization step. The optimization may be a process of selecting of a best parameter set with regard to the optimization target from a parameter space of possible parameters. The optimization target may be at least one criterion under which the optimization is performed. The optimization target may comprise at least one optimization goal and accuracy and/or precision. The optimization target may be at least one property of the workpiece 114. The property of the workpiece 114 may be at least one element selected from the group consisting of: weight of the workpiece 114, dimensions of the workpiece 114, warping.

The optimization target may be pre-specified such as by at least one customer and/or at least one user of the injection molding machine 110. The optimization target may be at least one user's specification. The user may select the optimization goal and a desired accuracy and/or precision. The predicted process parameter is provided to the injection molding machine 110 via at least one interface, in particular via a communication interface.

In step c), the manufactured workpiece 114 may be measured, e.g. by using optical or tactile measurement techniques such as scanning. The scanning may comprise determining shape and dimensions of the workpiece 114. The scanning may specifically be performed automatically. The scanning may be performed autonomously by a computer or computer network.

The determined property of the workpiece 114 may be compared to the optimization target. The comparison may comprise determining deviation from a target-shape and/or target-dimensions.

The generated workpiece 114 is considered to deviate from the target-shape and/or target-dimensions if a difference of the determined property and the optimization target is above a tolerance limit. The tolerance limit may depend on accuracy such as of the determining of the property and/or customer requirements and the like.

In case the property of the generated workpiece 114 deviates from the optimization target, at least one process parameter of the injection molding machine 110 is adapted depending on the comparison. The injection molding process, determining of the property of the generated workpiece 114, and comparing the property with the optimization target is repeated with adapted process parameter until the property of the generated workpiece 114 is in accordance with the optimization target at least within pre-defined tolerances.

Step d) 134 comprises determining at least one actual process parameter of the injection molding process. The injection molding machine 110 may be configured for measuring and/or monitoring process at least one process parameter during the injection molding process. The injection molding machine 110 may be configured for measuring the process parameters in real time and to adapt the process parameters on the run. The injection molding machine 110 may comprise at least one sensor. Measured parameters of the injection molding machine 110 may be registered and transferred to the external processing unit. The injection molding machine 110 may comprise at least one element selected from the group consisting of: a temperature sensor; a pressure sensor; a clock.

Step d) 134 further comprises comparing the actual process parameter and the predicted process parameter and adapting the simulation model based on the comparison. The comparison may comprise determining deviation of the predicted process parameter from the actual process parameter or view versa. The actual process parameter is considered to deviate from the predicted process parameter if a difference is above a tolerance limit. The tolerance limit may depend on measurement accuracy. The comparison may be performed by the internal processing unit of the injection molding machine. The information about the deviation and/or the actual process parameters may be transferred to the external processing unit. The external processing unit may be configured for adapting the simulation model, in particular the model parameters, based on the information about the deviation and/or the actual process parameters.

The method further may comprise outputting the predicted process parameter and/or a result of the comparison of the actual process parameter and the predicted process parameter via at least one output interface or port. The outputting may comprise a process of making information available to another system, data storage, person or entity. As an example, the output may take place via one or more interfaces, such as a computer interface or a human-machine interface.

The output, as an example, may take place in one or more of a computer-readable format, a visible format or an audible format.

Method steps a) to d) may be repeated, wherein the adapted simulation model may be used in step a).

Further in FIG. 1, the automated control system 112 is shown. The injection molding process is based on a plurality of process parameters. The control system 112 comprises the at least one external processing unit 118. The external processing unit 118 is configured for simulating an injection molding process based on a set of input parameters comprising at least one simulation model, material specific parameters and injection molding machine parameters by applying an optimizing algorithm in terms of at least one optimization target on the simulation model. The control system 112 comprises at least one interface, denoted with arrow 138, configured for providing the predicted process parameter to the injection molding machine 110. The control system 112 is configured for performing at least one injection molding process using the injection molding machine 110 based on the predicted process parameter for generating at least one workpiece 114. The control system 112 is configured for determining at least one property of the generated workpiece 114, for comparing the property with the optimization target and for adapting at least one process parameter of the injection molding machine 110 depending on the comparison. The control system 112 is configured for repeating the injection molding process, the determining of the property, the comparing of the property and the optimization target and the adapting of the process parameters until the property of the generated workpiece is in accordance with the optimization target at least within pre-defined tolerances. The control system 112 is configured for determining at least one actual process parameter of the injection molding process. The control system 112 is configured for comparing the actual process parameter and the predicted process parameter and for adapting the simulation model based on the comparison.

The automated control system 112 may be configured for performing the method according to the present invention. Thus, for possible embodiments reference is made to the description of the method.

Figure 2A:
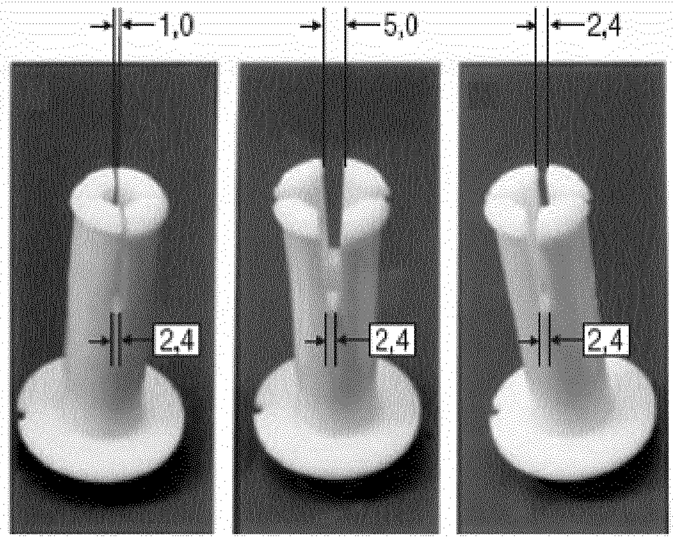
Figure 2D:
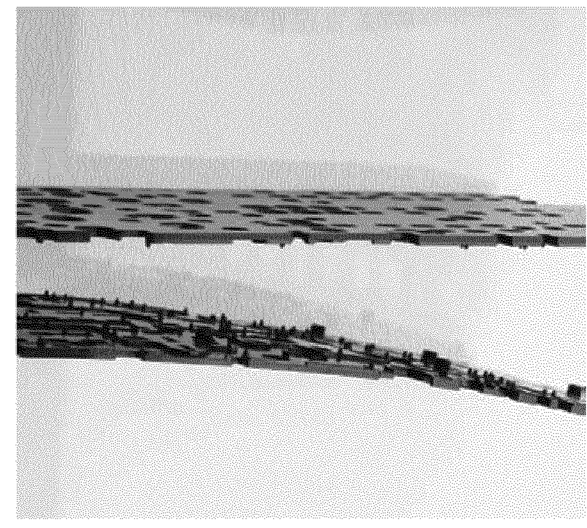

For example, the comparison of the determined property of the workpiece 114 with the optimization target may reveal that the workpiece 114 deviates from the desired shape and that, it in particular exhibits warpages such as twisting, warping, wavy surfaces and angle deviations. The cause for this may be a different shrinkage tendency (shrinkage potential) of the various areas of the workpiece 114. The shrinkage differences may be caused by different degrees of packing in different areas of the workpiece 114 as well as by different orientations of fibers and polymer chains. Further causes may be that the selected mold temperatures are unfavorable, that the molded workpiece 114 has different wall thicknesses, that the pressure gradient of the workpiece 114 is too high along the flow path, that the selected cooling time is too short so that the workpiece 114 is removed from the mold at a too high temperature and the workpiece 114 becomes deformed after being removed from the mold, that an unfavorable material is being used, or that glass fibers of glass fiber-reinforced thermo-plastics are oriented predominantly in the flow direction. In the latter case deviations may occur if the orientation of the glass fibers changes from place to place. The causes for this are for example, deflections in the flow, orientation effects at the end of the flow path, at weld lines and at gates. At least one of the following process parameters of the injection molding machine 110 may be adapted as follows depending on the comparison: changing temperatures for the mold halves and sliding cores, increasing the cooling time, adapting the process such that the molding is not catching or being held with negative draft, changing the holding pressure, and changing the holding time. Moreover, in view of the comparison the materials used may be changed. Specifically using low-warpage materials, e. g. blends with an amorphous phase, may be used. Moreover, the workpiece design may be changed. The process parameters of the injection molding machine may be adapted with respect to a pre-determined hierarchy. For example, first the mold temperature may be adapted, then the cooling time may be adapted. Subsequently the further process parameters may be adapted. FIGS. 2A to 2C show an influence of the mold temperature on the warpage for holding mandrels made of Ultraform®. For FIGS. 2A to 2C the mold temperature of the cavity was 80° C. For FIG. 2A the mold temperature of the core was 80° C., for FIG. 2B 30° C. and for FIG. 2C 50° C. Gaps between the elements of the holding mandrels differ for the Figures. In FIG. 2A the gap is 1.0 mm, for FIG. 2B 5.0 mm and for FIG. 2B 2.4 mm. FIG. 2D shows a further example of insulating panel made of glass fiber-reinforced Ultradur®. The upper part of FIG. 2D shows a molded part geometry optimized by simulation and the bottom shows the original situation.

LIST OF REFERENCE NUMBERS

110 injection molding machine
112 automated control system
114 workpiece
116 providing a set of input parameters
118 external processing unit
120 simulating
122 predicted process parameter of the simulated injection molding process
124 providing predicted process parameter
126 interface
130 performing
132 comparing
134 determining at least one actual process parameter
136 adapting
138 interface

The invention claimed is:

1. A computer-implemented method for controlling and/or monitoring at least one injection molding process in at least one injection molding machine, wherein the injection molding process is based on a plurality of process parameters, wherein the method comprises the following steps:

a) providing a set of input parameters by at least one external processing unit, wherein the set of input parameters comprises at least one simulation model, material specific parameters, and injection molding machine parameters;

b) by the external processing unit, simulating an injection molding process based on the set of input parameters and predicting at least one process parameter of the plurality of process parameters of the simulated injection molding process by applying an optimizing algorithm in terms of at least one optimization target on the simulation model, wherein the predicted process parameter of the plurality of process parameters is provided to the injection molding machine via at least one interface;

c) performing at least one injection molding process using the injection molding machine based on the predicted process parameter of the plurality of process parameters for generating at least one workpiece, determining at least one property of the generated workpiece, and comparing the property with the optimization target, wherein, in case the property of the generated workpiece deviates from the optimization target, at least one process parameter of the plurality of process parameters of the injection molding machine is adapted, based on a pre-determined hierarchy of the plurality of process parameters, depending on the comparison, and the performing injection molding process, the determining of the property of the generated workpiece, and the comparing the property with the optimization target is repeated, with the adapting at least one process parameter of the plurality of process parameters of the injection molding machine being performed after each repetition until the property of the generated workpiece is in accordance with the optimization target at least within pre-defined tolerances; and d) determining at least one actual process parameter of the plurality of process parameters of the injection molding process corresponding to the respective repetition of step c) that resulted in the property of the generated workpiece being in accordance with the optimization target, comparing the actual process parameter of the plurality of process parameters and the predicted process parameter of the plurality of process parameters, and adapting the simulation model based on the comparison.

2. The method according to claim 1, wherein method steps a) to d) are repeated, wherein the adapted simulation model is used in step a).

3. The method according to claim 1, wherein the injection molding machine parameters comprise at least one parameter selected from the group consisting of: polymer melt temperature, barrel temperature, injection unit temperature, screw speed, injection speed, holding pressure, holding time, cooling or curing time, and cooling or curing parameters.

4. The method according to claim 1, wherein measured parameters of the injection molding machine are registered and transferred to the external processing unit, wherein the injection molding machine comprises at least one element selected from the group consisting of: a temperature sensor; a pressure sensor; and a clock.

5. The method according to claim 1, wherein the simulation model comprises a filling simulation.

6. The method according to claim 1, wherein the simulation model is configured for simulating a filling of a mold cavity with a molten mass of at least one material.

7. The method according to claim 1, wherein the simulation model is configured for simulating geometry and/or shape of the workpiece.

8. The method according to claim 1, wherein the simulation model comprises a strength analysis.

9. The method according to claim 1, wherein the material specific parameters comprise at least one parameter selected from the group consisting of: compressibility, flow characteristics, and temperature characteristics.

10. The method according to claim 1, wherein the simulation model is configured for considering material specific properties.

11. The method according to claim 10, wherein the simulation model is configured for considering batch properties of raw material batches.

12. The method according to claim 1, wherein the method further comprises outputting the predicted process parameter of the plurality of process parameters and/or a result of the comparison of the actual process parameter of the plurality of process parameters and the predicted process parameter of the plurality of process parameters via at least one output interface or port.

13. The method according to claim 1, wherein the external processing unit is and/or comprises a cloud computing system.

14. At least one non-transitory storage medium having stored thereon computer-executable instructions which, when executed by at least one processor of a computer or computer system, cause the at least one processor to carry out the method according to claim 1.

15. An automated control system for an injection molding process in at least one injection molding machine, wherein the injection molding process is based on a plurality of process parameters, wherein the control system comprises at least one external processing unit, wherein the external processing unit is configured to simulate an injection molding process based on a set of input parameters comprising at least one simulation model, material specific parameters, and injection molding machine parameters by applying an optimizing algorithm in terms of at least one optimization target on the simulation model, wherein the control system further comprises at least one interface configured to provide a predicted process parameter of the plurality of process parameters to the injection molding machine, wherein the control system is configured to:

perform at least one injection molding process using the injection molding machine based on the predicted process parameter of the plurality of process parameters for generating at least one workpiece;

determine at least one property of the generated workpiece;

compare the property with the optimization target;

adapt at least one process parameter of the plurality of process parameters of the injection molding machine, based on a pre-determined hierarchy of the plurality of process parameters, depending on the comparison;

repeat the performing the injection molding process, the determining of the property, the comparing of the property and the optimization target, and the adapting of the at least one process parameter of the plurality of process parameters for at least one repetition until the property of the generated workpiece is in accordance with the optimization target at least within pre-defined tolerances;

determine at least one actual process parameter of the plurality of process parameters of the injection molding process corresponding to the respective repetition that resulted in the property of the generated workpiece being in accordance with the optimization target;

compare the actual process parameter of the plurality of process parameters and the predicted process parameter of the plurality of process parameters; and adapt the simulation model based on the comparison.

* * * * *